(12) United States Patent
Tsukamoto et al.

(10) Patent No.: US 11,380,915 B2
(45) Date of Patent: Jul. 5, 2022

(54) POWER SUPPLY SYSTEM, SERVER, AND POWER GENERATION FACILITY

(71) Applicant: HONDA MOTOR CO., LTD., Tokyo (JP)

(72) Inventors: Keiji Tsukamoto, Wako (JP); Masashi Shinohara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/142,340

(22) Filed: Jan. 6, 2021

(65) Prior Publication Data
US 2021/0218042 A1 Jul. 15, 2021

(30) Foreign Application Priority Data
Jan. 14, 2020 (JP) .............................. JP2020-003858

(51) Int. Cl.
*H01M 8/04* (2016.01)
*H01M 8/04089* (2016.01)
*H01M 8/04858* (2016.01)

(52) U.S. Cl.
CPC ... *H01M 8/04089* (2013.01); *H01M 8/04932* (2013.01)

(58) Field of Classification Search
CPC ...................... H01M 8/04089; H01M 8/04932
See application file for complete search history.

(56) References Cited

U.S. PATENT DOCUMENTS

2012/0123676 A1* 5/2012 Seino ................. G01C 21/3469
701/454
2019/0176640 A1* 6/2019 Lee ....................... B60W 20/13

FOREIGN PATENT DOCUMENTS

JP          2017216793 A    12/2017

\* cited by examiner

*Primary Examiner* — Olatunji A Godo
(74) *Attorney, Agent, or Firm* — Thomas | Horstemeyer, LLP

(57) ABSTRACT

A power supply system includes a power generation facility configured to supply power to a consumer and a server configured to communicate with the facility. The facility includes a fuel cell configured to generate, using fuel gas supplied via a supply path of the fuel gas to the consumer, power to be supplied to the consumer, and a measurement unit configured to measure a supply amount of the fuel gas used for the power generation. The server includes an acquisition unit configured to acquire information concerning a supply amount of the fuel gas supplied to the consumer, and a specifying unit configured to specify, based on a measurement result of the measurement unit received from the facility and the information, a supply amount of the fuel gas not used for the power generation in the supply amount of the fuel gas supplied to the consumer.

12 Claims, 6 Drawing Sheets

POWER SUPPLY SYSTEM, SERVER, AND POWER GENERATION FACILITY

CROSS-REFERENCE TO RELATED APPLICATION(S)

This application claims priority to and the benefit of Japanese Patent Application No. 2020-003858 filed on Jan. 14, 2020, the entire disclosure of which is incorporated herein by reference.

BACKGROUND OF THE INVENTION

Field of the Invention

The present invention relates to a technique of supplying power to a consumer.

Description of the Related Art

There is proposed a system in which a power generation facility including a fuel cell that generates power by fuel gas is installed to supply power to a consumer (Japanese Patent Laid-Open No. 2017-216793). Such system has an advantage that a consumer can make an attempt to reduce an electricity rate, and also has an advantage in using exhaust heat generated by power generation of the fuel cell.

If all fuel gas supplied to a consumer is used by the power generation facility, the consumer cannot use the fuel gas for another purpose, and the convenience thus deteriorates. If the consumer is allowed to use the fuel gas for another purpose, the use amount for another purpose and the use amount of the fuel gas concerning the power generation facility are included in the total supply amount of the fuel gas to the consumer. This hinders evaluation of the use result of the power generation facility such as charging concerning the power generation facility.

SUMMARY OF THE INVENTION

The present invention provides a technique capable of evaluating the use result of a power generation facility more accurately while ensuring the degree of freedom in use of fuel gas by a consumer.

According to one aspect of the present invention, there is provided a power supply system comprising:

a power generation facility configured to supply power to a consumer; and a server configured to communicate with the power generation facility, the power generation facility including a fuel cell configured to generate, using fuel gas supplied via a supply path of the fuel gas to the consumer, power to be supplied to the consumer, and a gas amount measurement unit configured to measure a supply amount of the fuel gas used for the power generation of the fuel cell, and the server including an acquisition unit configured to acquire information concerning a supply amount of the fuel gas supplied to the consumer, and a specifying unit configured to specify, based on a measurement result of the gas amount measurement unit received from the power generation facility and the information acquired by the acquisition unit, a supply amount of the fuel gas not used for the power generation of the fuel cell in the supply amount of the fuel gas supplied to the consumer.

Further features of the present invention will become apparent from the following description of exemplary embodiments (with reference to the attached drawings).

DESCRIPTION OF THE EMBODIMENTS

Figure 1:
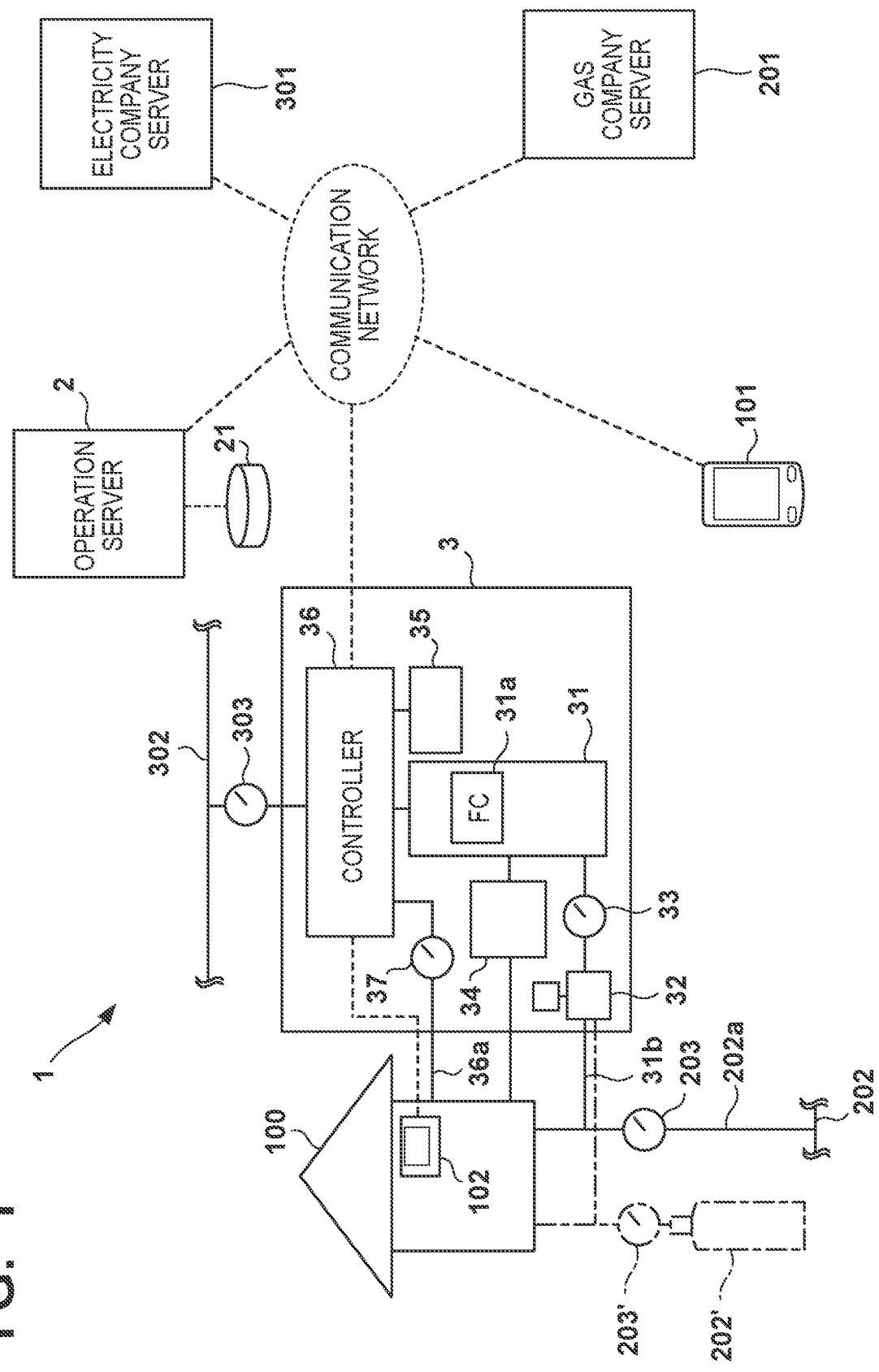
FIG. 1 is a block diagram of a power supply system according to an embodiment of the present invention.

Hereinafter, embodiments will be described in detail with reference to the attached drawings. Note that the following embodiments are not intended to limit the scope of the claimed invention, and limitation is not made to an invention that requires all combinations of features described in the embodiments. Two or more of the multiple features described in the embodiments may be combined as appropriate. Furthermore, the same reference numerals are given to the same or similar configurations, and redundant description thereof is omitted.

Configuration of System

FIG. 1 is a block diagram of a power supply system 1 according to an embodiment of the present invention. The power supply system 1 includes a power generation facility 3 for supplying power to a consumer 100, and an operation server 2 communicable with the power generation facility 3 via a communication network such as the Internet. In this embodiment, the consumer 100 is used as not only the meaning of a natural person but also, for example, the meaning of a facility for a detached house, each house of an apartment complex, or the whole apartment complex. FIG. 1 shows the consumer 100 as a house. The power generation facility 3 is exemplified as a facility with a small generating capacity for a household with a relatively low power consumption like a house. The power generation facility 3 includes a power generation unit 31, a control valve 32, a gas amount measurement unit 33, an exhaust heat supply unit 34, a power storage device 35, a controller 36, and a power amount measurement unit 37.

The power generation unit 31 is a unit including a fuel cell 31a for generating power using fuel gas. The fuel cell 31a according to this embodiment is a solid oxide fuel cell for generating power by an electrochemical reaction between hydrogen in fuel gas and oxygen in the air. In this embodiment, the fuel gas is natural gas (town gas) supplied to each house by a gas conduit 202. The consumer 100 is connected to a supply path 202a as a pipe that is branched from the gas conduit 202 to supply the fuel gas to the consumer 100.

The supply path 202a is provided with a gas amount measurement unit 203 for measuring the total amount of the fuel gas supplied to the consumer 100. The gas amount measurement unit 203 is managed by a gas company that supplies the fuel gas, and information of a measurement result is accumulated in a gas company server 201 managed by the gas company by communication or a meter reader. The power generation unit 31 is supplied with the fuel gas via a supply path 31b as a pipe that is branched from the supply path 202a on the downstream side of the gas amount measurement unit 203. The gas amount measurement unit 203 measures the total of the amount of the fuel gas supplied to the power generation unit 31 and the amount of the fuel gas not used in the power generation unit 31 and supplied to the consumer 100.

Note that this embodiment has exemplified the gas conduit 202 as the supply path of the fuel gas but the fuel gas may be supplied from a cylinder 202'. The cylinder 202' stores, for example, LP gas. The amount of the fuel gas supplied from the cylinder 202' is measured by a measurement unit 203'. A path for supplying the fuel gas from the cylinder 202' to the consumer 100 is branched on the downstream side of the measurement unit 203' to supply the fuel gas also to the power generation unit 31. The gas amount measurement unit 203' measures the total of the amount of the fuel gas supplied to the power generation unit 31 and the amount of the fuel gas not used in the power generation unit 31 and supplied to the consumer 100.

The power generation unit 31 includes a reformer that reforms the fuel gas and supplies it to the fuel electrode side of the fuel cell 31a, a blower that supplies air to the air electrode (oxygen electrode) side of the fuel cell 31a, and a water treatment vessel that condenses and collects humidity in exhaust gas from the fuel cell 31a, purifies it, and supplies it to the reformer.

The supply path 31b is provided with the control valve 32 and the gas amount measurement unit 33. The control valve 32 opens/closes the supply path 31b under the control of the controller 36. The control valve 32 is controlled to an open state during power generation of the power generation unit 31, and controlled to a closed state during the stop of power generation. The gas amount measurement unit 33 measures the supply amount of the fuel gas supplied to the power generation unit 31 (fuel cell 31a) via the supply path 31b. The difference between the gas amount of the measurement result of the gas amount measurement unit 203 and that of the measurement result of the gas amount measurement unit 33 indicates the amount of the fuel gas not used for power generation of the power generation unit 31 and used for another purpose in the consumer 100.

The controller 36 is electrically connected to the gas amount measurement unit 33, and acquires the measurement result. The gas amount measurement unit 33 may output a detection signal to the controller 36 every time a predetermined amount of fuel gas is detected or may output, to the controller 36, a value obtained by integrating the measurement result during a predetermined period. Note that in this embodiment, the operation server 2 acquires the measurement result of the gas amount measurement unit 33 by communication via the controller 36. However, the gas amount measurement unit 33 may include a communication apparatus, and the operation server 2 may acquire the measurement result of the gas amount measurement unit 33 by communication without intervention of the controller 36.

The exhaust heat supply unit 34 is a unit that supplies, to the consumer 100, exhaust heat generated by power generation of the fuel cell 31a. The exhaust heat supply unit 34 according to this embodiment supplies warm water to the consumer 100, and includes, for example, a tank that stores tap water supplied from the consumer 100 and a heat exchanger that performs heat exchange between tap water in the tank and the exhaust gas of the fuel cell 31a. The consumer 100 can directly use warm water supplied back from the tank of the exhaust heat supply unit 34 or further heat warm water and use it. Note that the supply form of the exhaust heat by the exhaust heat supply unit 34 is not limited to warm water, and may be warm air.

The power storage device 35 is a battery or capacitor that can be charged and discharged, and is used to accumulate surplus power generated by the fuel cell 31a. The power storage device 35 may be the battery of an electric vehicle owned by the consumer 100.

The controller 36 is an electric circuit that controls the overall power generation facility 3 and communicates with the operation server 2 via the communication network. The controller 36 includes a microcomputer including a processor represented by a CPU, a storage device such as a RAM, a ROM, or an HDD, a communication device, and an input/output interface for inputting/outputting data to/from an external device. The processor controls the power generation facility 3 by executing a program stored in the storage device.

The controller 36 also includes an inverter that converts DC power generated by the fuel cell 31a into AC power, and a switching circuit that switches between a power supply source and a power supply destination. The switching circuit switches, for example, the supply destination of the power generated by the fuel cell 31a to at least one of the power storage device 35, the consumer 100, and a power network 302. Furthermore, if the power generation amount of the fuel cell 31a is insufficient with respect to the demand power of the consumer 100, the switching circuit supplies, to the consumer 100, power supplied from the power network 302. The power network 302 is a grid power network, and a power distribution facility that supplies power to the consumer from a grid power company including a large-scale power plant.

The processor of the controller 36 normally controls the switching circuit and the like so that the power generated by the fuel cell 31a is converted into AC power and supplied to the consumer 101. Furthermore, if the power generated by the fuel cell 31a has surplus power, the processor of the controller 36 stores the surplus power in the power storage device 35. If the power generated by the fuel cell 31a has surplus power, and the operation server 2 issues a power selling instruction, the controller 36 converts the power generated by the fuel cell 31a into AC power and transmits it to the power network 302 (sells the power to the grid power company). A power amount measurement unit 303 is provided between the power network 302 and the controller 36. The power amount measurement unit 303 measures the amount of power supplied from the power network 302 to the controller 36 and the amount of power transmitted from the controller 36 to the power network 302. The power amount measurement unit 303 is managed by an electricity company (grid power company), and information of a measurement result is accumulated in an electricity company server 301 managed by the electricity company by communication or a meter reader.

The power amount measurement unit 37 measures the amount of power supplied from the power generation facility 3 to the consumer 100. The controller 36 is electrically connected to the power amount measurement unit 37, and acquires the measurement result. The controller 36 is electrically connected to a display device 102 provided in the consumer 100, and can display various kinds of information such as the operation status of the power generation facility 3 and charging on the display device 102.

The operation server 2 is a server computer including a processor represented by a CPU, a storage device such as a RAM, a ROM, or an HDD, and a communication device. The storage device includes a database (DB) 21 of consumer information. The consumer information includes personal information such as contact information of a consumer, the identification information of the power generation facility 3, and information such as the operation result of the power generation facility 3 (the measurement results of the gas amount measurement unit 33 and the power amount measurement unit 37 and the like), charging information, comparison information (to be described later), the total gas supply amount of fuel gas, and the power supply amount of grid power concerning each consumer. The operation server 2 can also transmit various kinds of information such as the operation status of the power generation facility 3 and charging to a portable terminal 101 such as a smartphone of the consumer 100.

Charging Relationship

Figure 2:
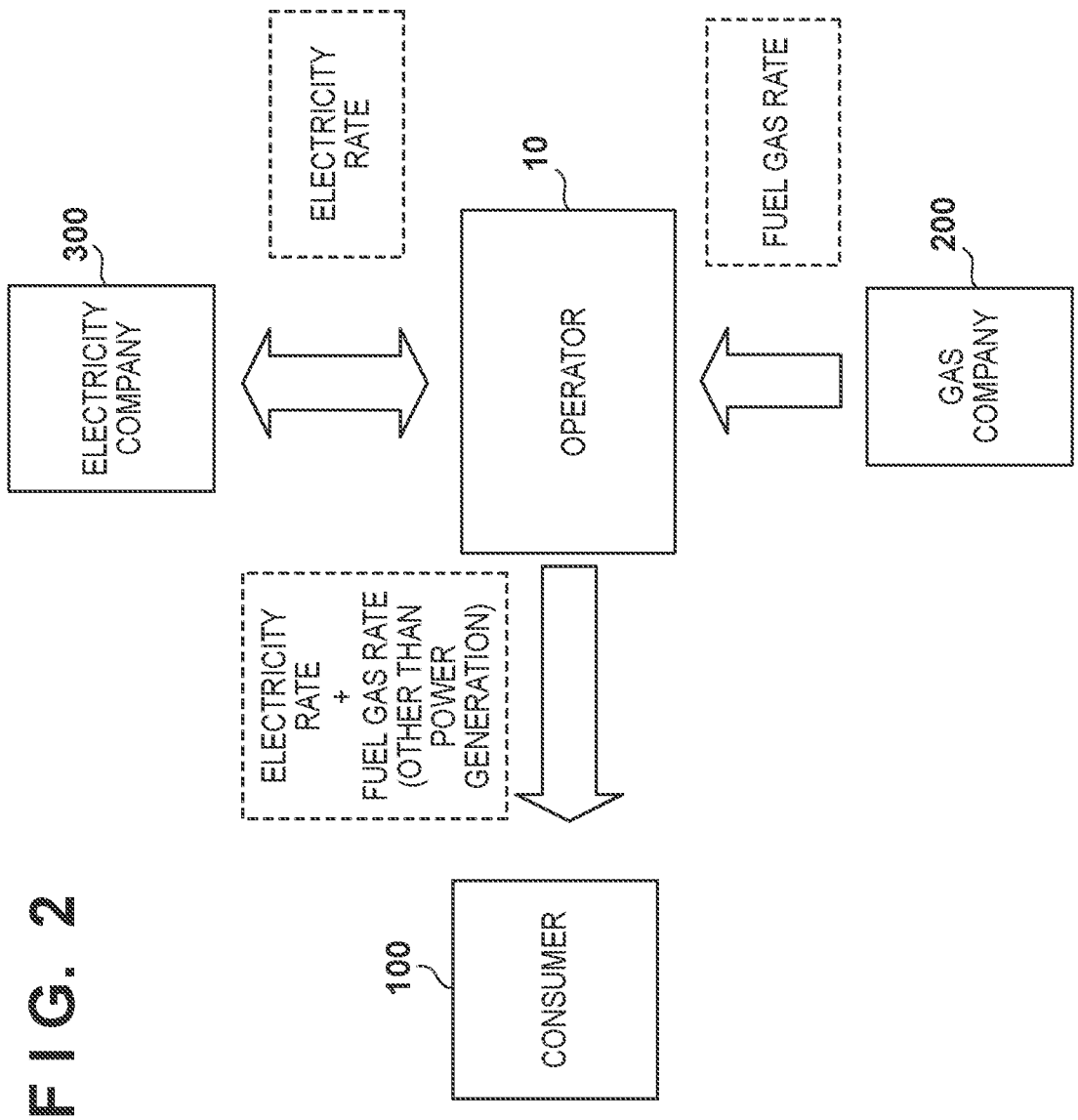
FIG. 2 is a view showing an example of a charging relationship concerning the power supply system.

An example of the operation form of the power supply system 1 will be described. The operator of the power supply system 1 manages/operates the operation server 2 and the power generation facility 3. The power generation facility 3 is leased to the consumer 100 free of charge or at a low price. The consumer 100 and the operator agree that charging of fuel gas and grid power supplied to the consumer 100 is billed by the operator by a contract between a gas company 200 and an electricity company 300. FIG. 2 exemplifies the charging relationship under the above assumption.

The gas company 200 charges an operator 10 a fuel gas rate corresponding to the supply amount measured by the gas amount measurement unit 203. The electricity company 300 charges the operator 10 the difference between a power selling amount and a power purchase amount measured by the power amount measurement unit 303 or returns the difference to the operator 10. In principle, the operator 10 charges the consumer 100 only an electricity rate associated with power supplied from the power generation facility 3 to the consumer 100. However, as an exception, if the consumer 100 uses fuel gas for a purpose other than power generation of the power generation facility 3, the operator 10 charges the consumer 100 a corresponding rate.

To supply power generated by the power generation facility 3 to the consumer 100, a power distribution facility is not required, the consignment charge is not needed, and the power generation efficiency of the fuel cell 31a is high. Furthermore, it is possible to reduce the amount charged by the electricity company 300 or gain a profit by selling, to the electricity company, the power generated by the power generation facility 3. Therefore, the operator can gain a profit while providing power to the consumer 100 at a lower price.

In this embodiment, the exhaust heat supply unit 34 provides warm water to the consumer 100 free of charge. The consumer 100 has not only an advantage that the electricity rate can be reduced but also an advantage that warm water can be provided free of charge.

Example of Processing of Operation Server

Figure 3:
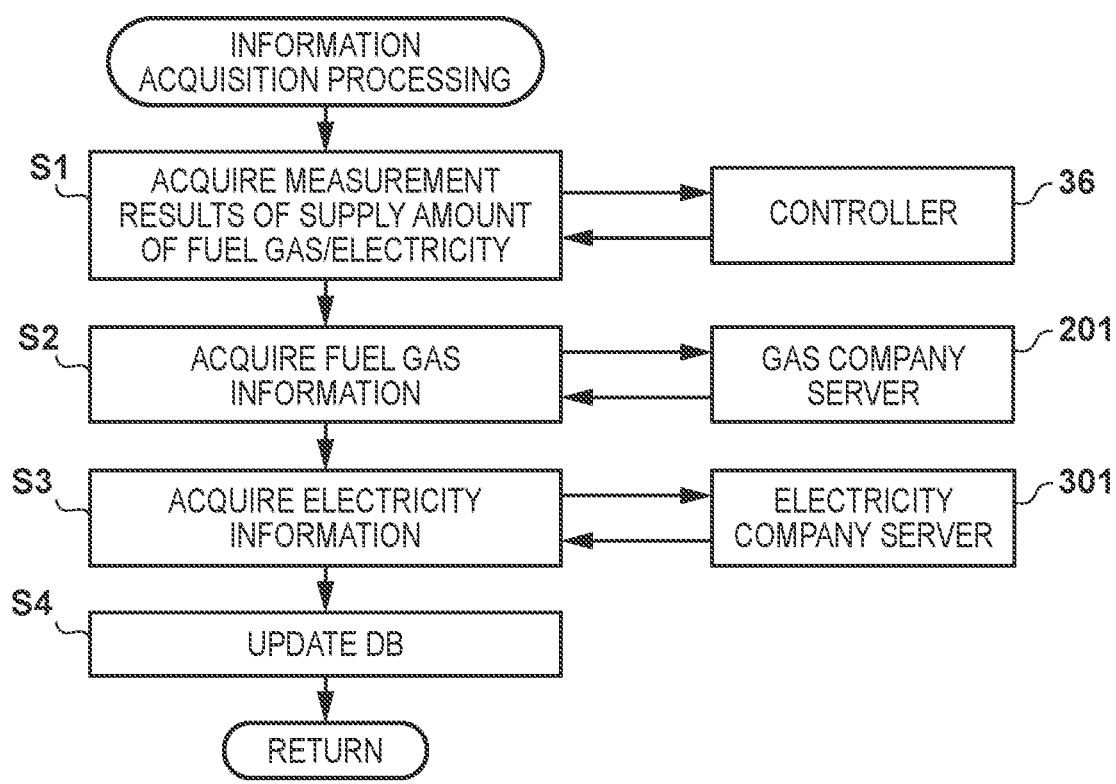
FIG. 3 is a flowchart illustrating a processing example by a server.

An example of the processing of the processor of the operation server 2 concerning a charge to the consumer 100 will be described. To decide a charge to the consumer 100, the operation server 2 collects various kinds of information periodically. FIG. 3 is a flowchart illustrating an example of information acquisition processing executed by the operation server 2. The processing shown in FIG. 3 is executed at a charging period (for example, one month).

In step S1, information of the supply amount of fuel gas supplied to the power generation facility 3 and information of the supply amount of power supplied from the power generation facility 3 to the consumer 100 are acquired. More specifically, the operation server 2 transmits a transmission request of these pieces of information to the controller 36 of the power generation facility 3 of the target consumer 100. In response to this request, the controller 36 transmits, to the operation server 2, the measurement results of the gas amount measurement unit 33 and the power amount measurement unit 37 for a predetermined charging period (a period corresponding to the charging period), and the operation server 2 receives them.

In step S2, information (fuel gas information) of the total supply amount of the fuel gas supplied to the consumer 100 and the power generation facility 3 is acquired. More specifically, the operation server 2 transmits, to the gas company server 201, a transmission request of the fuel gas information during the charging period of the target consumer 100. In response to this request, the gas company server 201 transmits, to the operation server 2, the fuel gas information based on the measurement result of the gas amount measurement unit 203, and the operation server 2 receives it.

In step S3, information (electricity information) of the amount of power supplied to the power generation facility 3 and the amount of power transmitted from the power generation facility 3 is acquired. More specifically, the operation server 2 transmits, to the electricity company server 301, a transmission request of the electricity information during the charging period of the target consumer 100. In response to this request, the electricity company server 301 transmits the electricity information based on the measurement result of the power amount measurement unit 303 to the operation server 2, and the operation server 2 receives it.

In step S4, the accumulation information of the target consumer 100 in the DB 21 is updated with the pieces of information acquired in steps S1 to S3. Then, the information acquisition processing ends.

Figure 4:
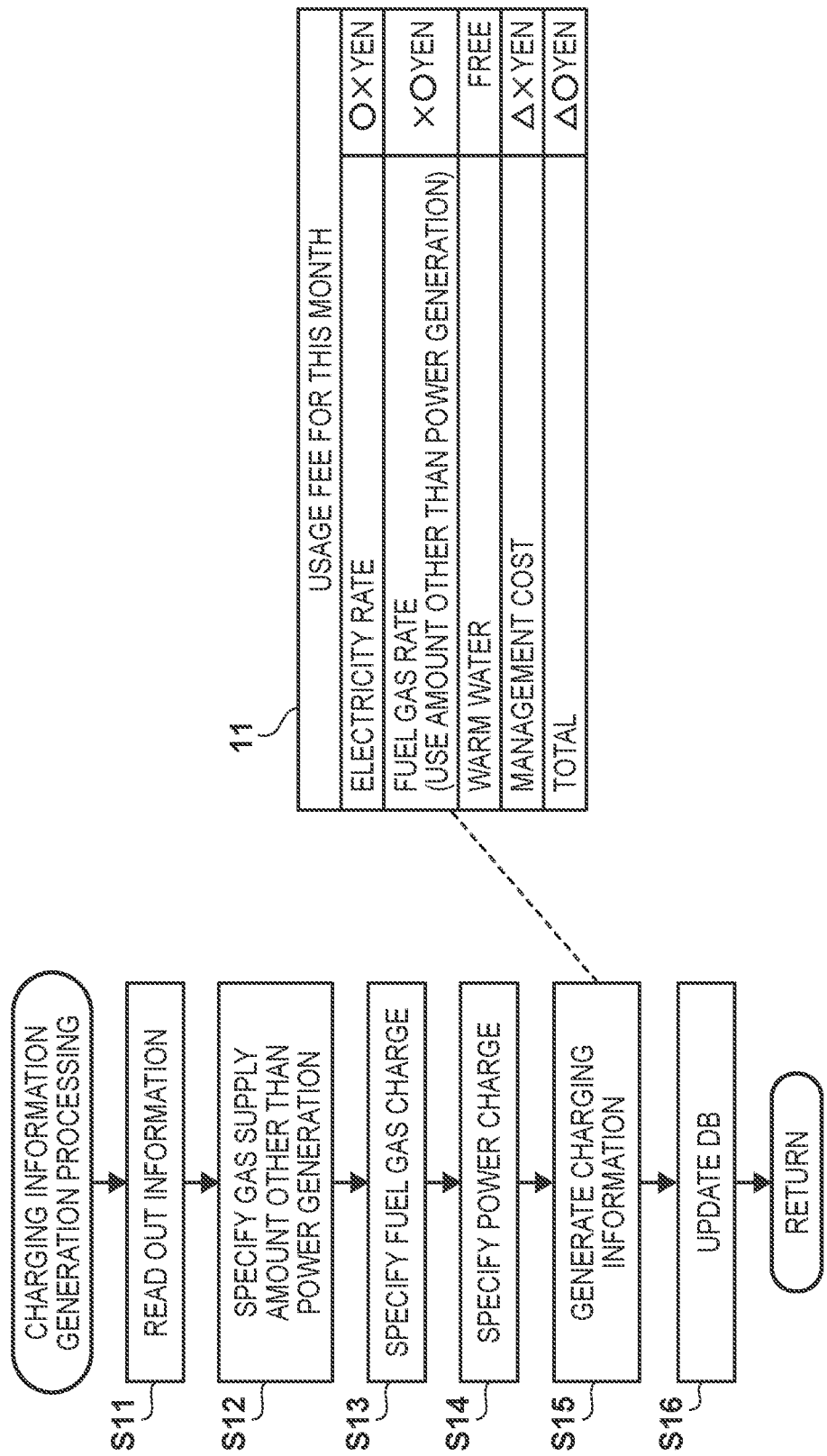
FIG. 4 is a flowchart illustrating a processing example by the server.

FIG. 4 is a flowchart illustrating an example of charging information generation processing executed by the operation server 2. The processing shown in FIG. 4 is processing of generating charging information indicating a charge to the consumer 100, and is executed at a charging period. In step S11, the information of the target consumer 100 is read out from the DB 21. In step S12, in the supply amount of the fuel gas supplied to the consumer 100, a supply amount of fuel gas not used for power generation of the fuel cell 31a and consumed by the consumer 100 for a purpose other than power generation is specified. More specifically, in the information read out from the DB 21, the difference between the total supply amount indicated by the fuel gas information acquired in step S2 and the supply amount of the fuel gas acquired in step S1 is calculated, and is set as a supply amount used for the purpose other than power generation.

In step S13, a fuel gas charge to the consumer 100 is specified. A charge corresponding to the supply amount used for the purpose other than power generation specified in step S12 is decided. The fuel gas amount used for power generation of the power generation facility 3 is not included in a charging target. The charge corresponding to the supply amount used for the purpose other than power generation may be an amount corresponding to the supply amount used for the purpose other than power generation of the charge billed to the operator 10 by the gas company 200.

In step S14, a power charge to the consumer 100 is specified. A power charge is specified based on the power supply amount acquired in step S1 of the information read out from the DB 21. For example, a power charge may be calculated by multiplying the power supply amount by a unit price. This power charge is basically regarded as a price for power generated from fuel gas by the fuel cell 31a. If, as a result of a shortage of the power generation amount of the fuel cell 31a with respect to the demand power of the consumer 100, power supplied from the power network 302 is supplied to the consumer 100, a price for the supplied power may be added by another method, for example, an amount corresponding to the supplied power in a charge from the electricity company 300 may be added. Conversely, if the power generated by the fuel cell 31a has surplus power, and the surplus power is sold to the electricity company 300 to gain a profit, all or part of the profit may be subtracted from the power charge.

In step S15, a management cost is added to the fuel gas charge specified in step S13 and the power charge specified in step S14, thereby generating charging information 11. The operator charges the consumer 100 using contents of the charging information 11. Since the consumer 100 is collectively charged the fuel gas rate and the electricity rate, it becomes easier to grasp a utility cost. The management cost is, for example, a maintenance fee for the power generation facility 3 or a fee when selling the surplus power of the fuel cell 31a. The management cost may be free. The charging information 11 shown in FIG. 4 indicates that the exhaust heat supply unit 34 provides warm water free of charge. It is possible to provide a beneficial feeling to the consumer 100.

In step S16, the information of the consumer 100 in the DB 21 is updated with the charging information 11 generated in step S15. For example, the charging information 11 accumulated in the DB 21 can be transmitted from the operation server 2 to the portable terminal 101, and displayed on the portable terminal 101. The charging information 11 can also be transmitted from the operation server 2 to the controller 36, and the controller 36 can display the charging information 11 on the display device 102. This allows the consumer 100 to confirm a charging status.

As described above, according to this embodiment, the supply path 202a is branched to be able to supply fuel gas to each of the consumer 100 and the power generation facility 3, and the consumer 100 can thus use the fuel gas for a purpose other than power generation. Therefore, it is possible to ensure the degree of freedom in use of the fuel gas by the consumer 100. Furthermore, by measuring, using the gas amount measurement unit 33, the fuel gas supplied to the power generation facility 3, it is possible to distinguish the amount of fuel gas used for power generation from the amount of fuel gas used for a purpose other than power generation. Therefore, it is possible to evaluate the use result of the power generation facility 3 more accurately.

Figure 5:
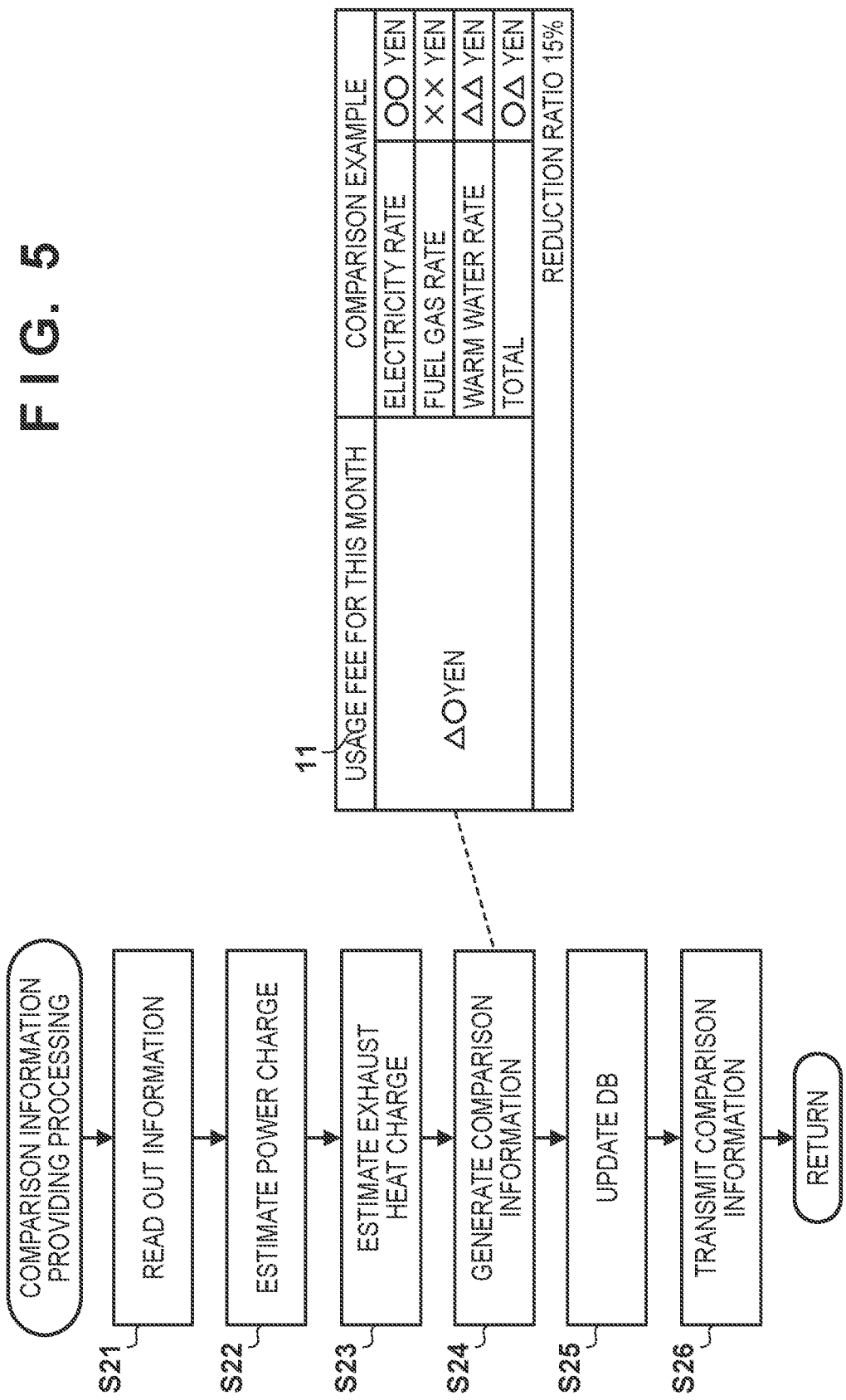
FIG. 5 is a flowchart illustrating a processing example by the server.

Subsequently, an example of the processing of the processor of the operation server 2 will be described. FIG. 5 is a flowchart illustrating an example of comparison information providing processing executed by the operation server 2. In this processing, comparison information indicating the difference in a charge between a case in which the power generation facility 3 is used and a case in which the power generation facility 3 is not used is generated and provided to the consumer 100.

In step S21, the information of the target consumer 100 is read out from the DB 21. In step S22, a power charge by the electricity company 300 is estimated when the power supply amount acquired in step S1 of the information read out from the DB 21 is all supplied from a power system (electricity company 300). This estimation processing is performed in accordance with the charging rule of the electricity company 300.

In step S23, an exhaust heat charge is estimated. A charge is estimated when a heat amount corresponding to exhaust heat supplied as warm water to the consumer 100 is obtained from fuel gas or power supplied from the power system. Either a fuel gas charge or a power charge is possible. A charge may be an estimate. For an estimate, for example, an exhaust heat amount is calculated by multiplying the operating time of the power generation unit 31 by a coefficient, and is further multiplied by a coefficient, thereby obtaining a heat amount supplied to the consumer 100. Assume, for example, that 50% of the exhaust heat amount is supplied to the consumer 100. An amount of fuel gas or power necessary to generate the thus calculated heat amount is calculated. Then, a charge when receiving supply of the calculated fuel gas amount from the gas company 200 or when receiving the supply of the calculated amount of power from the electricity company 300 is calculated. The charge is estimated in accordance with the charging rule of the gas company 200 or the electricity company 300.

In step S24, comparison information 12 is generated from the information read out in step S21 and the charge estimated in step S22. In the comparison information 12, a rate (a usage fee for this month) when the power generation facility 3 is used and a rate (comparison example) when the power generation facility 3 is not used are described. The electricity rate of the comparison example is the power charge estimated in step S22. The fuel gas rate of the comparison example is equal to that (a usage fee for a purpose other than power generation) in the charging information shown in FIG. 4. The warm water rate of the comparison example is the exhaust heat charge estimated in step S23. A reduction ratio indicates a reduction ratio of the rate (the usage fee for this month), charged when the power generation facility 3 is used, to the total rate of the comparison example.

In step S25, the information of the consumer 100 in the DB 21 is updated with the comparison information 12 generated in step S24. The comparison information 12 accumulated in the DB 21 can be transmitted from the operation server 2 to the portable terminal 101 in step S26, and displayed on the portable terminal 101. The comparison information 12 may be transmitted from the operation server 2 to the controller 36, and the controller 36 may display the comparison information 12 on the display device 102. This allows the consumer 100 to recognize an advantage obtained by the introduction of the power generation facility 3.

Note that in the comparison information providing processing, in addition to estimation of the power charge and the exhaust heat charge, the reduction ratio of carbon dioxide generated when the power generation facility 3 is used to that generated when the power generation facility 3 is not used may be estimated and an estimation result may be included in the comparison information 12. This allows the consumer 100 to recognize contribution to environmental conservation by the introduction of the power generation facility 3.

Figure 6:
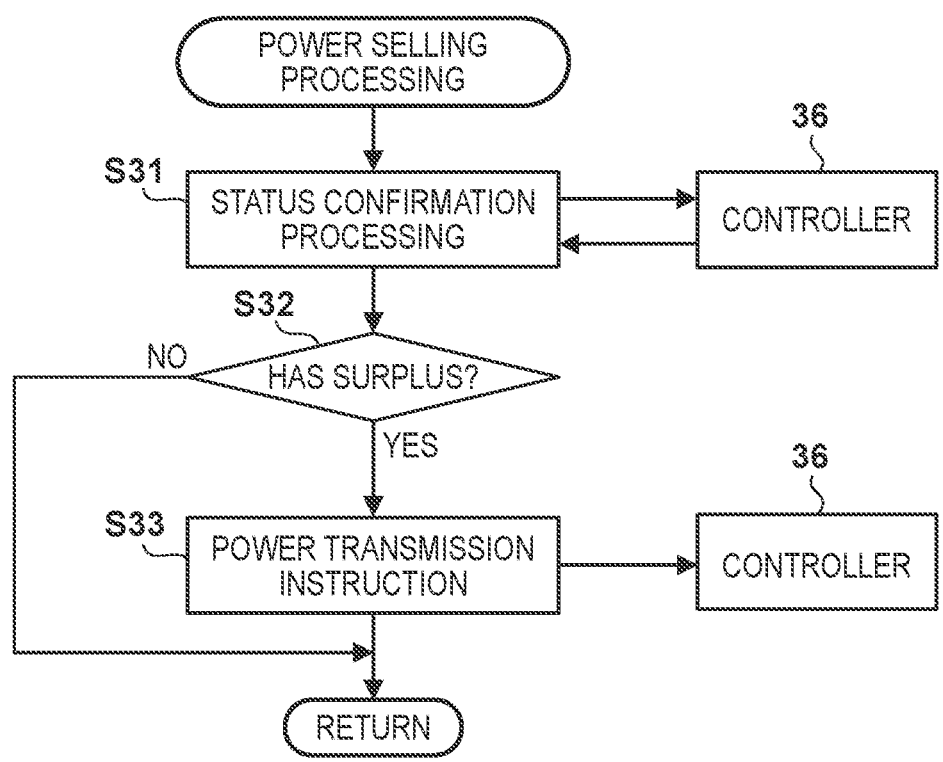
FIG. 6 is a flowchart illustrating a processing example by the server.

Subsequently, another example of the processing of the processor of the operation server 2 will be described. FIG. 6 is a flowchart illustrating an example of power selling processing executed by the operation server 2. In this processing, the operation server 2 issues a surplus power selling instruction to the controller 36 of the power generation facility 3.

The operation server 2 periodically makes a power purchasing and selling plan based on the information from the electricity company server 301 and other power demand information. In the purchasing and selling plan, during a power selling period, the processing shown in FIG. 6 instructs the power generation facility 3 having surplus power to transmit power to the power system. This makes it possible to use the power generation facility 3 as a VPP.

In step S31, status confirmation processing is performed. An inquiry about the operation status of the power generation facility 3 is transmitted to the controller 36. The controller 36 transmits, as a response, information indicating whether the power generation facility 3 is in a status in which it has surplus power. In step S32, based on the response received from the controller 36, it is determined whether the power generation facility 3 has surplus power. If the power generation facility 3 has surplus power, the process advances to step S33. In step S33, a power transmission instruction is issued. An instruction to transmit the surplus power to the power network 302 is transmitted to the controller 36. Upon receiving the instruction, the controller 36 transits the surplus power to the power network 302.

Summary of Embodiments

The abovementioned embodiments disclose at least the following power supply system, server, and power generation facility.

1. A power supply system (1) of the above-described embodiment is a power supply system comprising:
a power generation facility (3) configured to supply power to a consumer (100); and
a server (2) configured to communicate with the power generation facility,
the power generation facility including
a fuel cell (31*a*) configured to generate, using fuel gas supplied via a supply path (202*a*) of the fuel gas to the consumer, power to be supplied to the consumer, and
a gas amount measurement unit (33) configured to measure a supply amount of the fuel gas used for the power generation of the fuel cell, and
the server including
an acquisition unit (S2) configured to acquire information concerning a supply amount of the fuel gas supplied to the consumer, and
a specifying unit (S12) configured to specify, based on a measurement result of the gas amount measurement unit received from the power generation facility and the information acquired by the acquisition unit, a supply amount of the fuel gas not used for the power generation of the fuel cell in the supply amount of the fuel gas supplied to the consumer.

According to this embodiment, it is possible to provide a technique capable of evaluating the use result of the power generation facility more accurately while ensuring the degree of freedom in use of the fuel gas by the consumer.

2. In the power supply system of the above-described embodiment,
the power generation facility includes a power amount measurement unit (37) configured to measure an amount of power supplied to the consumer,
the server includes a charging information generation unit (S15) configured to generate charging information indicating a charge to the consumer, and
the charging information includes information concerning a power charge based on the measurement result of the power amount measurement unit received from the power generation facility and a gas charge based on the supply amount of the fuel gas specified by the specifying unit.

According to this embodiment, it is possible to set a charge to the consumer more accurately while ensuring the degree of freedom in use of the fuel gas by the consumer.

3. In the power supply system of the above-described embodiment,
the power generation facility includes an exhaust heat supply unit (34) configured to supply, to the consumer, exhaust heat generated by the power generation of the fuel cell, and
the supply of the exhaust heat is not included in a charging target for the consumer.

According to this embodiment, it is possible to promote the spread of the system.

4. In the power supply system of the above-described embodiment,
the server includes a comparison information generation unit (S24) configured to generate comparison information (12) by comparing the power charge with an estimated charge when all the power supplied from the power generation facility to the consumer is supplied from a power system.

According to this embodiment, it is possible to make the consumer recognize the advantage of the system.

5. In the power supply system of the above-described embodiment,
the server includes a comparison information generation unit (S24) configured to generate comparison information (12) by comparing the power charge with an estimated charge when all the power supplied from the power generation facility to the consumer is supplied from a power system and an estimated charge when a heat amount corresponding to the exhaust heat supplied to the consumer is obtained from the fuel gas or the power supplied from the power system.

According to this embodiment, it is possible to make the consumer recognize the advantage of the system.

6. In the power supply system of the above-described embodiment,
the server includes a transmission unit (S26) configured to transmit the comparison information to a communication terminal of the consumer.

According to this embodiment, it is possible to make the consumer recognize the advantage of the system.

7. In the power supply system of the above-described embodiment,
in response to an instruction transmitted from the server (S33), the power generation facility transmits the power generated by the fuel cell to a power network of a power system.

According to this embodiment, it is possible to use surplus power of the power generation facility.

8. A server (2) of the above-described embodiment is a server communicable with a power generation facility (3) configured to supply power to a consumer (100),
the power generation facility including a fuel cell (31*a*) configured to generate, using fuel gas supplied via a supply path (202*a*) of the fuel gas to the consumer, power to be supplied to the consumer, and a gas amount measurement unit (33) configured to measure a supply amount of the fuel gas used for the power generation of the fuel cell, and the server comprising:

an acquisition unit (S2) configured to acquire information concerning a supply amount of the fuel gas supplied to the consumer; and a specifying unit (S12) configured to specify, based on a measurement result of the gas amount measurement unit received from the power generation facility and the information acquired by the acquisition unit, a supply amount of the fuel gas not used for the power generation of the fuel cell in the supply amount of the fuel gas supplied to the consumer.

According to this embodiment, it is possible to provide a technique capable of evaluating the use result of the power generation facility more accurately while ensuring the degree of freedom in use of the fuel gas by the consumer.

9. A power generation facility (3) of the above-described embodiment is a power generation facility, communicable with a server (2), for supplying power to a consumer (100), and comprises a fuel cell (31a) configured to be supplied with fuel gas via a supply path (202a) of the fuel gas to the consumer, and to generate, using the fuel gas, power to be supplied to the consumer, and a gas amount measurement unit (33) configured to measure a supply amount of the fuel gas supplied to the fuel cell, wherein a measurement result of the gas amount measurement unit is transmitted to the server.

According to this embodiment, it is possible to provide a technique capable of evaluating the use result of the power generation facility more accurately while ensuring the degree of freedom in use of the fuel gas by the consumer.

The invention is not limited to the foregoing embodiments, and various variations/changes are possible within the spirit of the invention.

What is claimed is:

1. A power supply system comprising:
a power generation facility configured to supply power to a consumer; and
a server configured to communicate with the power generation facility,
the power generation facility including
a fuel cell configured to generate, using fuel gas supplied via a supply path of the fuel gas to the consumer, power to be supplied to the consumer, and
a gas amount measurement unit configured to measure a supply amount of the fuel gas used for the power generation of the fuel cell, and
the server including
an acquisition unit configured to acquire information concerning a supply amount of the fuel gas which was supplied to the consumer in a predetermined period, and
a specifying unit configured to specify, based on a measurement result, in the predetermined period, of the gas amount measurement unit received from the power generation facility and the information acquired by the acquisition unit, a supply amount of the fuel gas which was not used for the power generation of the fuel cell in the supply amount of the fuel gas which was supplied to the consumer in the predetermined period.

2. The system according to claim 1, wherein
the power generation facility includes a power amount measurement unit configured to measure an amount of power supplied to the consumer, the server includes a charging information generation unit configured to generate charging information indicating a charge to the consumer, and the charging information includes information concerning a power charge based on the measurement result of the power amount measurement unit received from the power generation facility and a gas charge based on the supply amount of the fuel gas specified by the specifying unit.

3. The system according to claim 2, wherein
the power generation facility includes an exhaust heat supply unit configured to supply, to the consumer, exhaust heat generated by the power generation of the fuel cell, and
the supply of the exhaust heat is not included in a charging target for the consumer.

4. The system according to claim 2, wherein the server includes a comparison information generation unit configured to generate comparison information by comparing the power charge with an estimated charge when all the power supplied from the power generation facility to the consumer is supplied from a power system.

5. The system according to claim 3, wherein the server includes a comparison information generation unit configured to generate comparison information by comparing the power charge with an estimated charge when all the power supplied from the power generation facility to the consumer is supplied from a power system and an estimated charge when a heat amount corresponding to the exhaust heat supplied to the consumer is obtained from the fuel gas or the power supplied from the power system.

6. The system according to claim 4, wherein the server includes a transmission unit configured to transmit the comparison information to a communication terminal of the consumer.

7. The system according to claim 5, wherein the server includes a transmission unit configured to transmit the comparison information to a communication terminal of the consumer.

8. The system according to claim 1, wherein in response to an instruction transmitted from the server, the power generation facility transmits the power generated by the fuel cell to a power network of a power system.

9. A server communicable with a power generation facility configured to supply power to a consumer,
the power generation facility including a fuel cell configured to generate, using fuel gas supplied via a supply path of the fuel gas to the consumer, power to be supplied to the consumer, and a gas amount measurement unit configured to measure a supply amount of the fuel gas used for the power generation of the fuel cell,
the server comprising:
an acquisition unit configured to acquire information concerning a supply amount of the fuel gas which was supplied to the consumer in a predetermined period; and
a specifying unit configured to specify, based on a measurement result, in the predetermined period, of the gas amount measurement unit received from the power generation facility and the information acquired by the acquisition unit, a supply amount of the fuel gas which was not used for the power generation of the fuel cell in the supply amount of the fuel gas which was supplied to the consumer in the predetermined period.

10. A power generation facility, communicable with a server, for supplying power to a house, comprising:

a fuel cell configured to be supplied with fuel gas via a supply path of the fuel gas to the house, and to generate, using the fuel gas, power to be supplied to the house; and a gas amount measurement unit configured to measure a supply amount of the fuel gas supplied to the fuel cell, wherein a measurement result of the gas amount measurement unit is transmitted to the server.

11. The system according to claim 1, wherein the consumer is a house.

12. The system according to claim 1, wherein the fuel gas is natural gas.

* * * * *